United States Patent [19]

Powell

[11] 4,436,460
[45] Mar. 13, 1984

[54] AUTOMATIC DEPTH COMPENSATING SYSTEM

[75] Inventor: Thomas A. Powell, Rockford, Ill.

[73] Assignee: Ex-Cell-O Corporation, Troy, Mich.

[21] Appl. No.: 272,450

[22] Filed: Jun. 11, 1981

[51] Int. Cl.³ .............................................. B23B 41/12
[52] U.S. Cl. ...................................... 408/14; 408/10; 408/13; 409/184
[58] Field of Search .................. 408/8, 10, 11, 13, 14, 408/714, 95, 97, 98; 409/184, 185; 51/168

[56] References Cited

U.S. PATENT DOCUMENTS

| | | | |
|---|---|---|---|
| 3,487,729 | 1/1970 | Juhasz et al. | 408/14 |
| 3,574,290 | 4/1971 | Eckman | 408/13 |
| 3,663,138 | 5/1972 | Petroff | 408/10 |
| 3,762,827 | 10/1973 | Ziegelmeyer | 408/14 |
| 3,767,313 | 10/1973 | Bohoroquez et al. | 408/14 |
| 3,865,010 | 2/1975 | Hodgson | 408/10 |
| 3,989,405 | 11/1976 | Quackenbush | 408/10 |
| 4,083,646 | 4/1978 | Vindez | 408/14 |
| 4,175,894 | 12/1979 | Skrentner | 408/8 |

Primary Examiner—Z. R. Bilinsky
Assistant Examiner—Daniel W. Howell
Attorney, Agent, or Firm—John C. Evans

[57] ABSTRACT

A machine tool control system adapted to provide automatic depth compensation for a cutting tool which controls the position of the tool in relation to a workpiece to hold the predetermined depth of a sleeve bore surface.

4 Claims, 13 Drawing Figures

AUTOMATIC DEPTH COMPENSATING SYSTEM

BACKGROUND AND SUMMARY OF THE INVENTION

The invention relates to an automatic depth compensation system which holds the depth of a sleeve bore on a workpiece. Originally, adjustments of the tool were made manually. That is, the bore and length of the workpiece would be measured with a gauge means, and any adjustments were made manually. Later developments provided for automatic movement of the tool to provide for compensation of the bore diameter, such as disclosed in U.S. Pat. No. 3,620,131 and 3,620,132. U.S. Pat. No. 3,995,528 discloses a tool length compensation which programs the performance of each tool used. U.S. Pat. No. 3,965,621 and 4,195,250 disclose automatic measuring and tool position compensating systems. U.S. Pat. No. 3,950,427 discloses a zero offset for machine tool control.

The present invention includes means responsive to a depth compensation signal indicated by gauge means located in a following station. The signal controls a power supply to a stepping motor located at the rear of a spindle. The motor is selectively energized to turn an inner, threaded sleeve in a tool body which effectively changes the relationship of a tool point relative to register spots on a workpiece. One unique feature comprises a "bootstrapping" effect wherein the shaft that turns the threaded sleeve to position an axially movable stop ring also serves as a torque arm to prevent the ring from rotating. A further feature is that the movable stop is the adjustable member in the system rather than the tool point itself.

DESCRIPTION OF THE PREFERRED INVENTION

Figures 1, 1A:
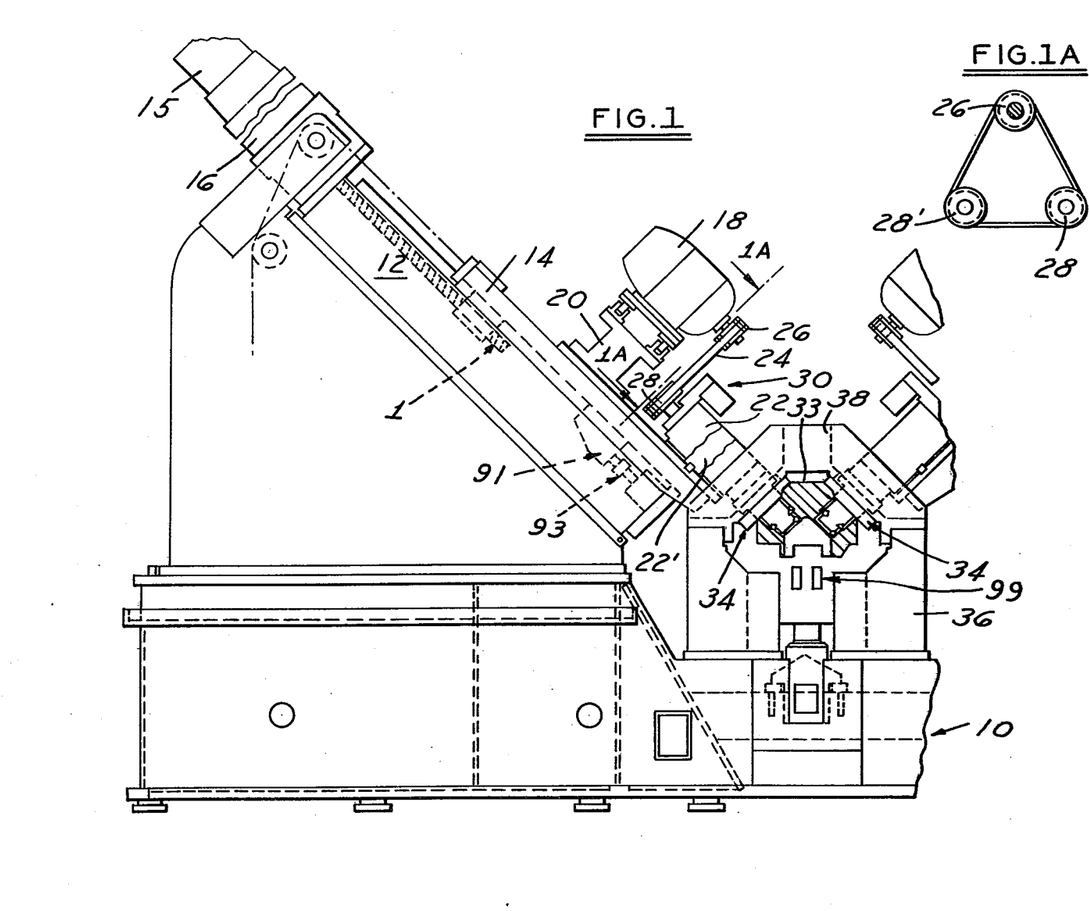
FIG. 1 shows a partial end view of an inline transfer mechanism.
FIG. 1A is a sectional view taken along the line 1A—1A of FIG. 1 looking in the direction of the arrows.

The invention relates to an automatic tool compensation to finish a bore, chamfer and face the cylinder sleeve bore in an engine block. FIG. 1 shows a single station of a typical inline transfer line showing a bed 10 having an inclined rail bed 12 on which a corresponding main slide 14 rides thereon. The main slide 14 is adapted for movement by means of a recirculating ball screw driven by conventional electric motors 15 and gear box 16. A motor 18 is fastened to a mount 20 secured to the main slide 14. Motor 18 rotates the spindle head assembly or spindle head assemblies 22, 22' by means of a belt 24 through drive pulley 26 and driven pulleys 28, 28'.

An automatic compensating stepping motor means 30 is mounted on the rear of each of the spindle head assemblies 22, 22'. The cutting tool assemblies 32 to finish bore, chamfer, and face a cylinder bore are shown in FIG. 1. Each of the cutting tool assemblies 32 is adapted to be moved into and out of an engine block 33. Block 33 is clamped into fixture locating plates 34. The fixture locating plates 34 are mounted on to a frame 38, in turn mounted to fixture base 36. The engine block bank surfaces are located against the fixture locating plates and the tool stops on the engine bank surfaces.

Figure 2A:
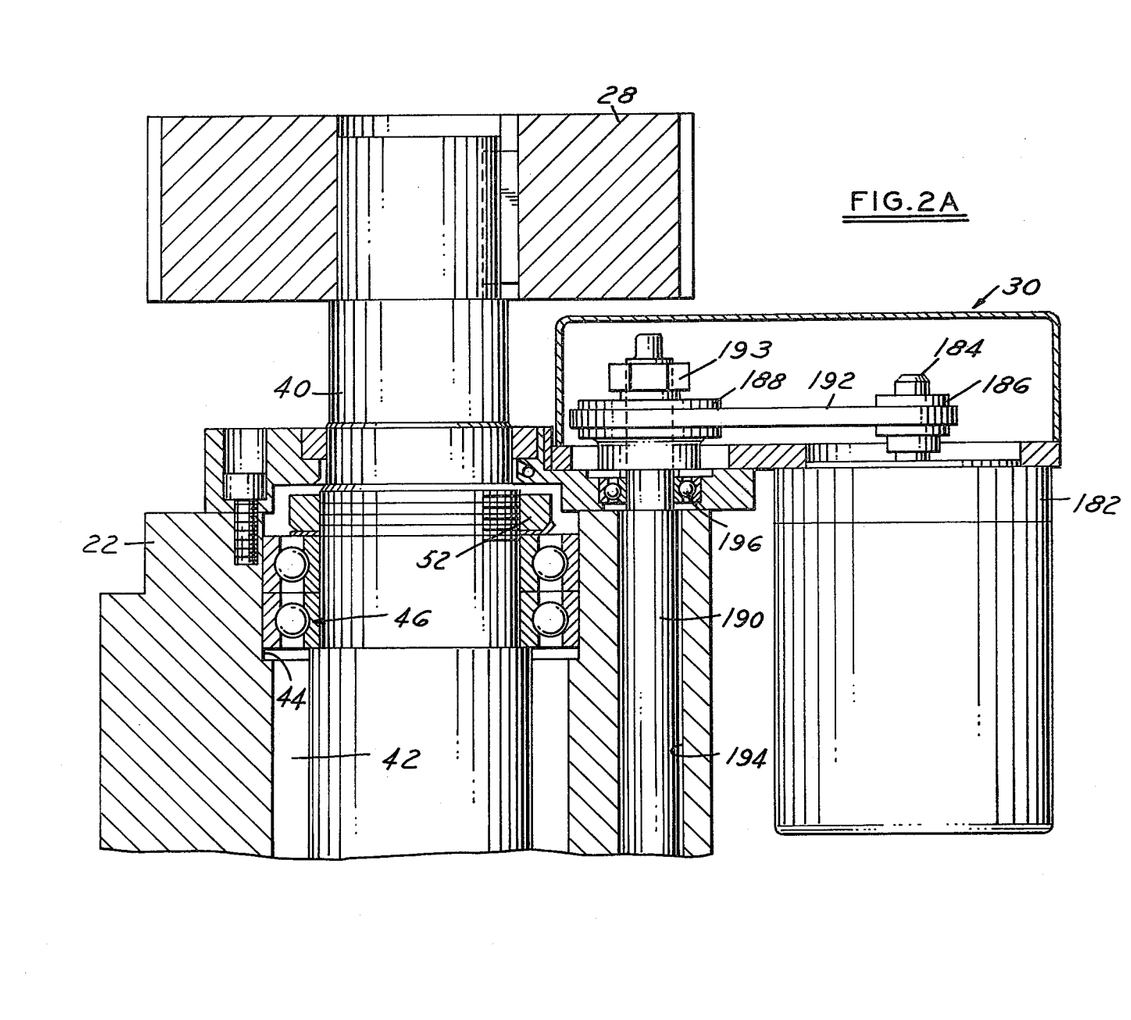
FIG. 2A is a sectional view of the top half or rear of the spindle, partially in elevation.

FIG. 2A shows a spindle shaft 40 of the spindle head assembly 22. The following described components are also in spindle head assembly 22'. Shaft 40 is adapted to be rotated by means of the belt 24 mounted on the pulley 28. The shaft 40 of the spindle is mounted in stepped bores 42, 44 of spindle head assembly 22 and supported by upper and lower bearings 46 and 48 respectively. The upper bearings 46 are axially floating in bore 44 and are mounted on the upper shaft portion and locked in place by means of a threaded nut 52. The lower bearings 48 are mounted in a secure relationship by abutment against the shoulder 54 of an inner bore 56 of spindle head assembly 22. The lower bearings 48 are retained on the spindle shaft 40 by a nut 62 threaded on shaft 40. Annular ring 64 abuts one face of the bearing 48 and the threaded nut 62. The front portion of spindle shaft 40 terminates in a tool holder shaft portion 66 which includes an axially aligned threaded bore 68.

Figure 2B:
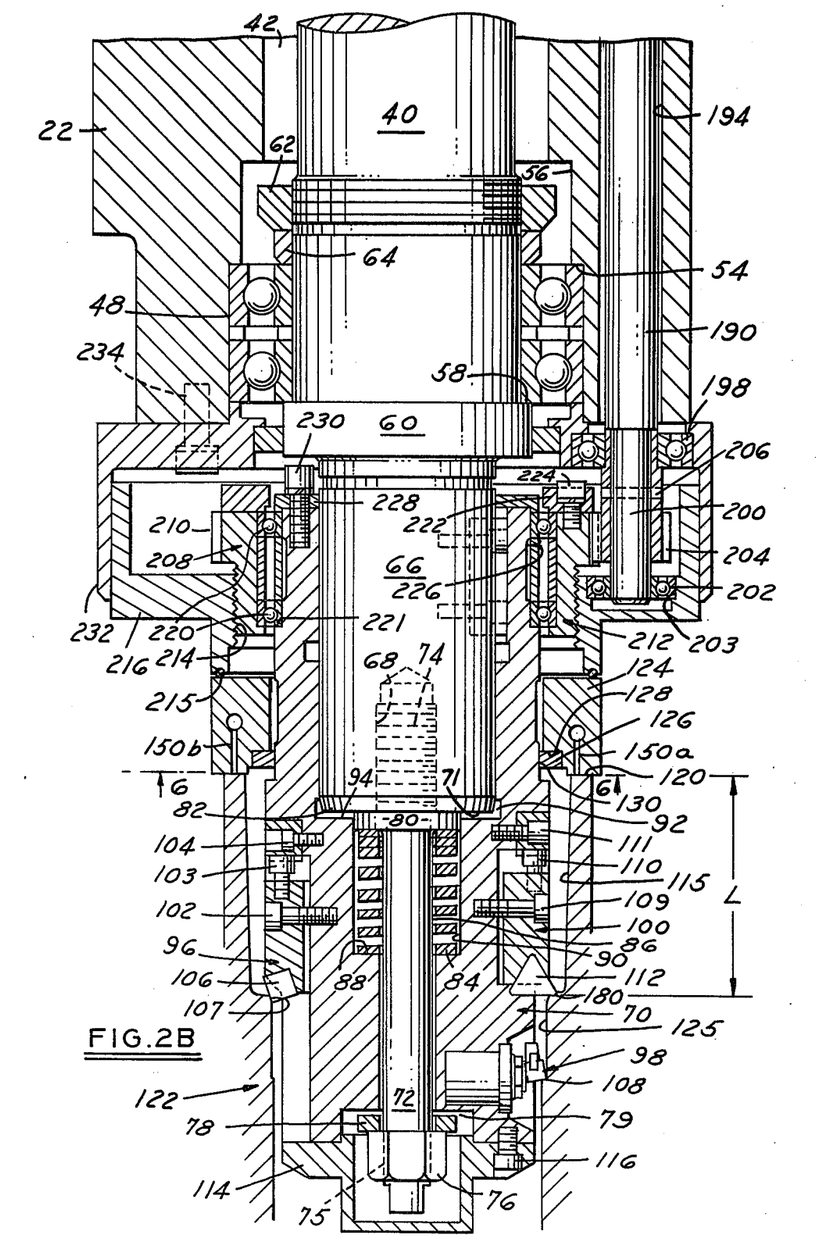
FIG. 2B is a sectional view of the bottom half or front portion of the spindle head and a tool holder.
Figure 3:
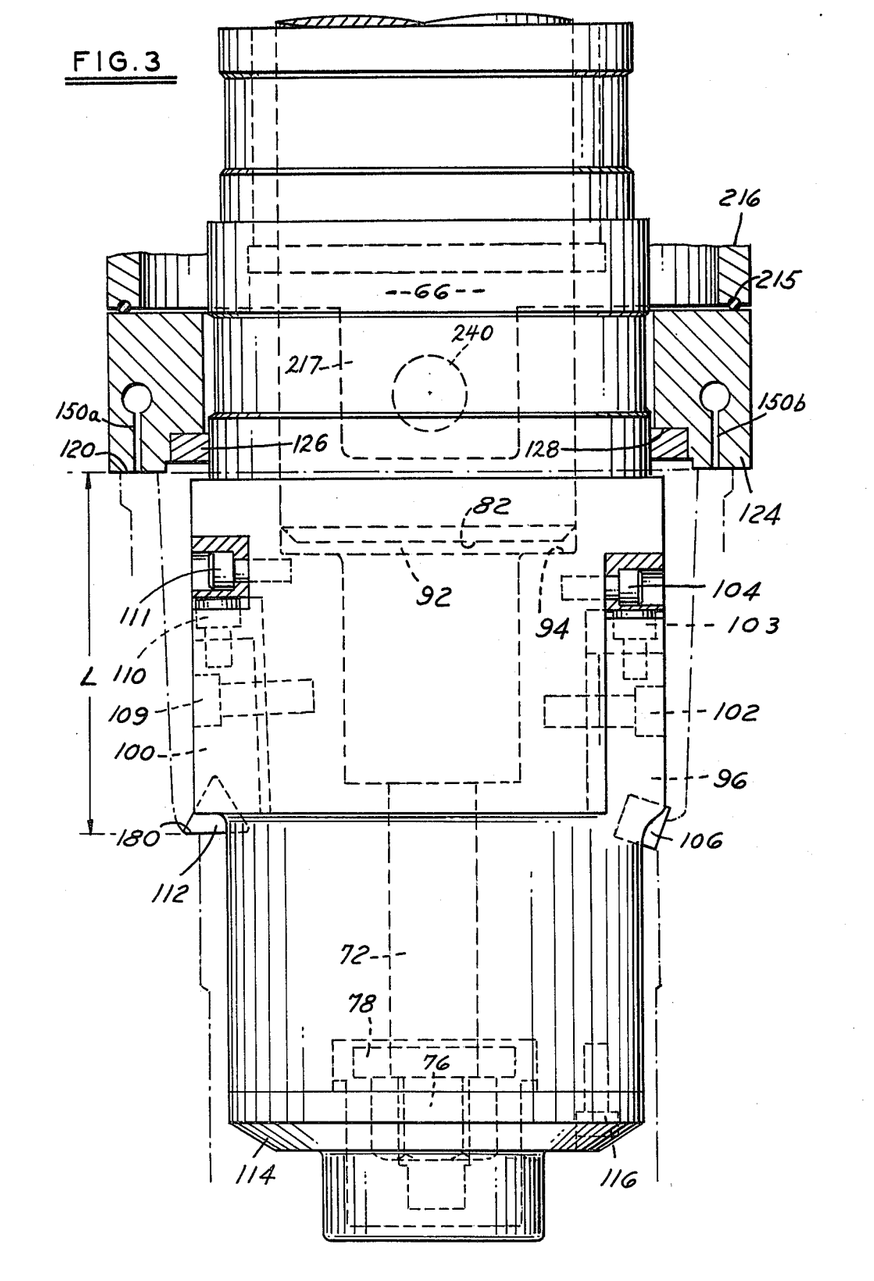
FIG. 3 is an enlarged side elevational view of a tool holder and cutting tools.
Figure 4:
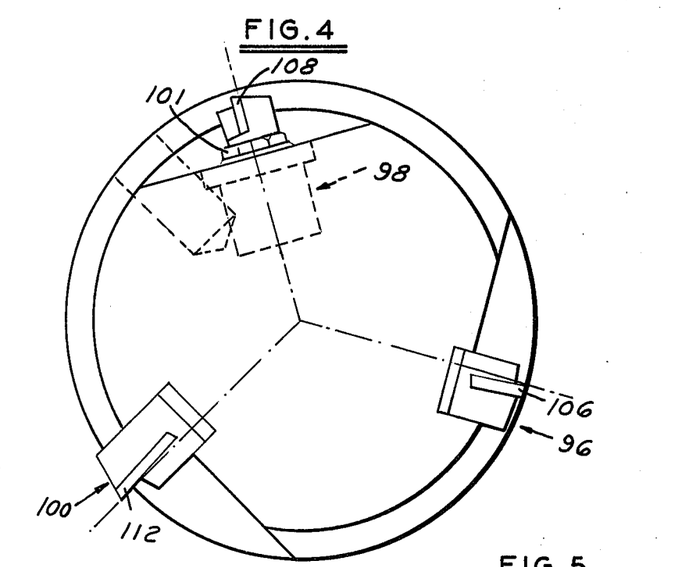
FIG. 4 is an end elevational view of FIG. 3 and showing the angular relationship of cutting tools.
Figure 5:
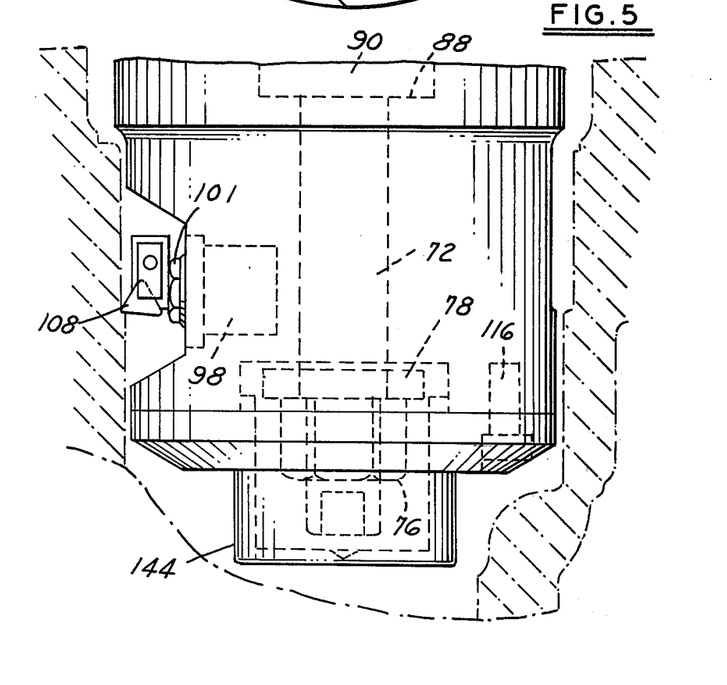
FIG. 5 is a side-elevational view of the tool holder and boring tool.

As shown in FIG. 2B, the tool holder 70 is mounted on the frontal portion 71 of spindle shaft 40 by means of an axial screw 72 having a threaded portion 74 on one end which is threaded into threaded bore 68 of tool holder portion 66 of spindle shaft 40. The axial screw 72 includes a thread 75 at the other end thereof onto which a nut 76 is mounted thereon with a washer 78 to hold the tool holder 70 axially aligned to the spindle shaft 40. The screw 72 includes an extension or collar 80 adjacent the threaded end portion 74. One end of collar 80 abuts the front face 82 of the tool holder shaft portion 66. A spring 84 axially aligned over the diameter 86 of screw 72 abuts the other end of collar 80 and abuts a shoulder portion 88 of an axially recessed bore 90. Each tool holder 70 is thereby spring loaded against the collar 78. As the tool approaches the workpiece, the spindle head assembly 22 touches the work surface 120 and stops the tool holder 70. The main slide 14 continues to move until a stop block 91 thereon engages its own stop 93 creating an air gap 79. This insures that each spindle will be referenced to the work surface 120 even though the faces of the work surface may differ in axial location. As the assembly moves toward the work surface air is blown through the passages in annular stop ring 124 to clean off the stop reference spots on the engine block bank face.

In the preferred embodiment shown, the tool holder 70 consists of three cartridges; namely, a chamfering tool cartridge 96, a finish boring tool cartridge 98, and a shoulder cutting tool cartridge 100. The chamfer cartridge tool 96 is a typical conventional cartridge which is attached to the tool body 70 by means of screw 102. Screw 103 is an adjusting screw which controls axial position. Screw 104 holds a stop block in place. The purpose of the chamfer tool 106 is to chamfer the edge 107 to provide for easy insertion of a sleeve liner. The boring tool cartridge 98 is a conventional boring tool with an adjusting nut 101 to provide for radial adjustment of the tool 108. The shoulder cutting tool cartridge 100 comprises a conventional preset cartridge which is attached to the tool body 70 by means of screw 109. Screw 111 holds a stop block in place. The adjustment of chamfer tool 96 is accomplished by screw 103, and the adjustment of shoulder cutting tool 100 is accomplished by screw 110. The purpose of the shoulder cutting tool 112 is to establish a finish bore diameter to be held for location from surface 120 on the work with ±0.0008 of an inch, in a manner to be described hereinafter. A cap or cover 114 is secured to the front end of the cutting tool 70 by means of conventional screws 116, to prevent swarf or other contaminents from entering the inner mechanism of the cutting tool and spindle head.

AUTOMATIC DEPTH COMPENSATION MECHANISM

FIG. 1 shows the spindle head assembly 22 in typical position for operation on a workpiece engine block 33 on the transfer bar assembly 99. The main slide 14 stops against its normal positive stop means 93, as shown in FIG. 1. The stop means 93 provides for final stopping the main slide 14 0.030 inches after stopping tool holder 70 on work surface 120.

The movements during a working cycle are as follows:

The main slide 14 rapid traverses spindle or spindles 22 from a "transfer clear" position to a start feed position at the outboard end of a stepped engine block cast chamber 115 which, when finished, receives a liner 117.

An "L" depth from the outer end of bore 115 to a shoulder 180 is held so that the liner 117 can be accurately seated between a cylinder head and a bore counterbore which is depth compensated by an improved control operation of the spindle assembly 22 to be described. The liner 117 has an annular rib 121 formed intermediate its ends with a surface 117a located "L" distance from inner end 117b. Rib 121 has a recess 123 which creates a tight seal against leakage between a water jacket 127 and the combustion chamber.

Following rapid traverse, the main slide 14 is driven at a slower movement for feeding tool 108 through bore 125, 1.5 inches in one working embodiment. Tools 106, 108 are not cutting until near the end of this feed. Spring 84 has sufficient force to provide holding power to absorb the axial thrust imposed on holder 70 and thus seats the tool holder 70 against work surface 120 during the slower feed stroke. At the end of this feed stroke, tool holder 70 through a connection to annular stop ring 124 and a collar 216 is stopped against the workpiece at surface 120 to thus control depth "L". Main slide 14 continues feeding for some small runout distance, 0.030 inch in one working embodiment. The only load placed on the workpiece is the spring load from spring 84. The workpiece is thereby isolated from the total force from the main slide 14. This runout feature enables multiple spindles to be mounted on the same main slide 14 while holding the "L" dimension with respect to variable locations on surface 120.

Also, the difference between register points R1, R2 on the upper bank rail 120a and lower bank rail 120b for each individual spindle is averaged due to swivel of ring 124 at a swivel pin 240. If only one register spot is used the mechanism could be simplified to eliminate pin 240.

Figure 10:
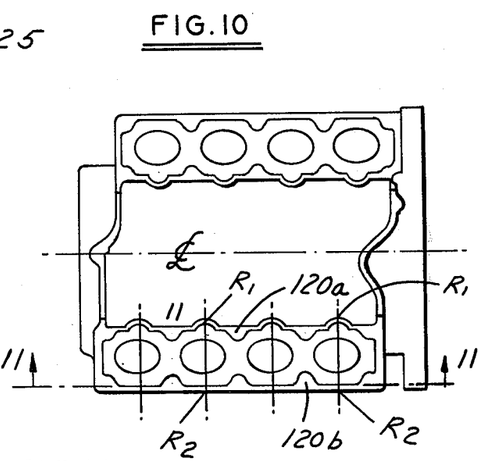
FIG. 10 is a top elevational view of reference surfaces on a workpiece having two bores, simultaneously compensated by two spindles on a single slide.
Figure 11:
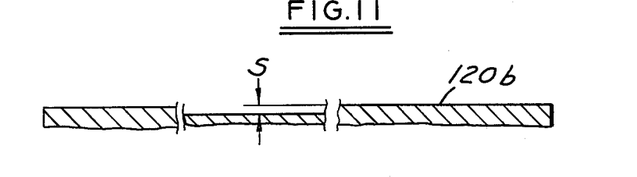
FIG. 11 is a fragmentary, enlarged sectional view taken along the line 11—11 of FIG. 10 looking in the direction of the arrows.

As best seen in FIGS. 10 and 11, the surface 120 can be stepped along the length as shown by a dimension S or can be twisted as long as the step or twist is less than the available 0.030 inch runout distance.

Figure 6:
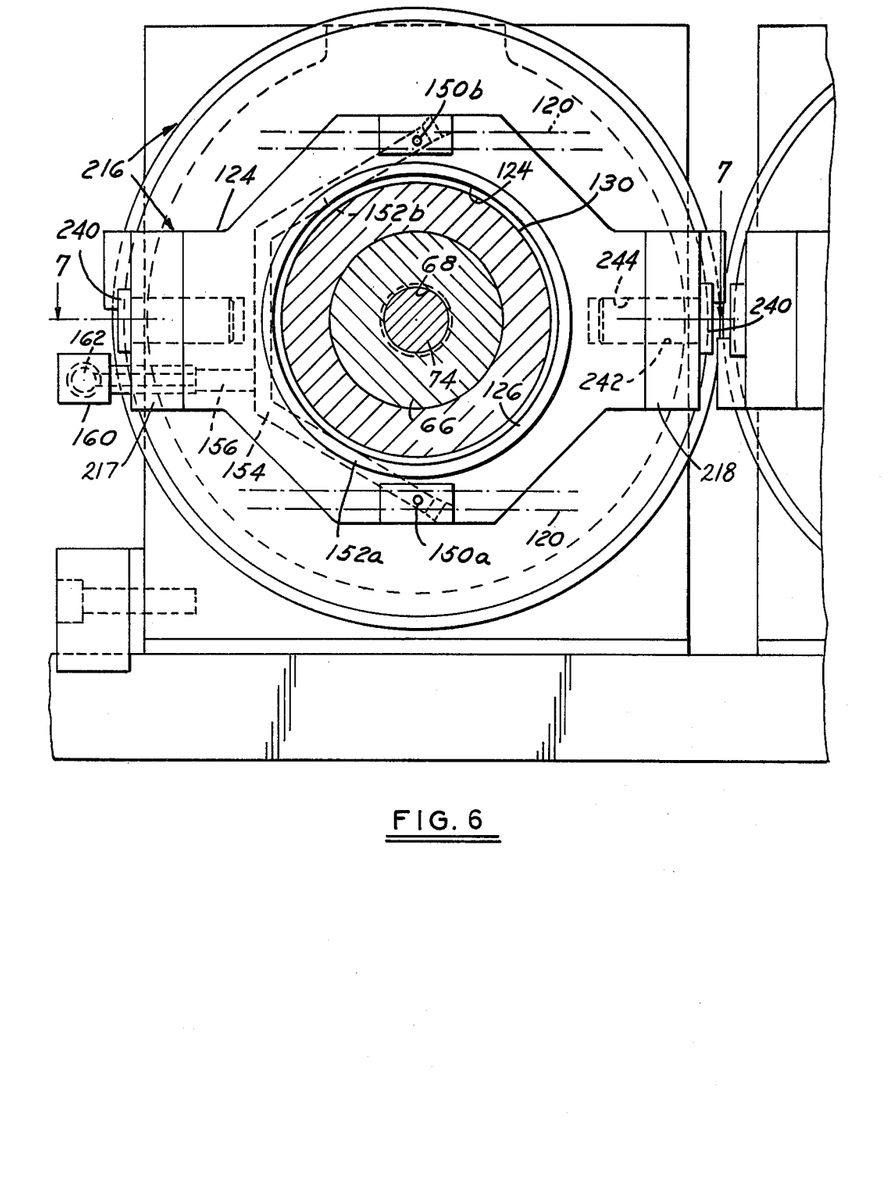
FIG. 6 is a cross-sectional view taken along the line 6—6 of FIG. 2B looking in the direction of the arrows.
Figure 7:
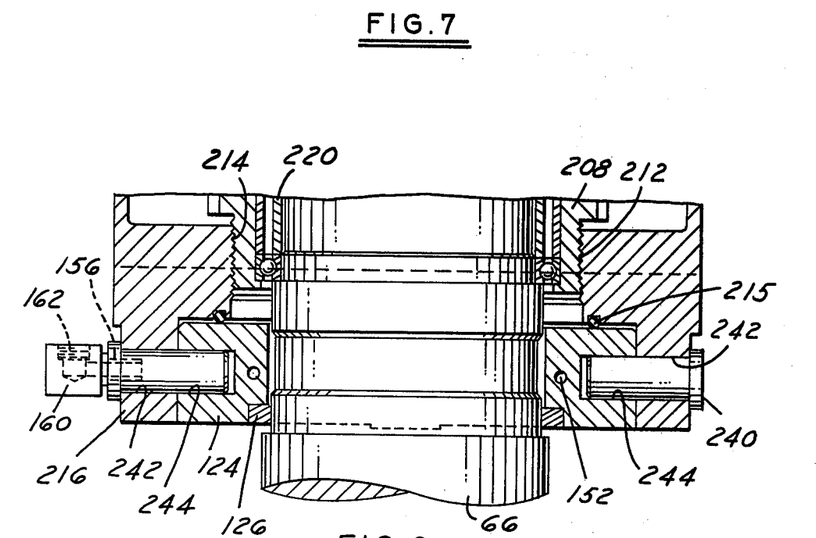
FIG. 7 is a cross-sectional view taken along line 7—7 of FIG. 6, looking in the direction of the arrows.
Figure 8:
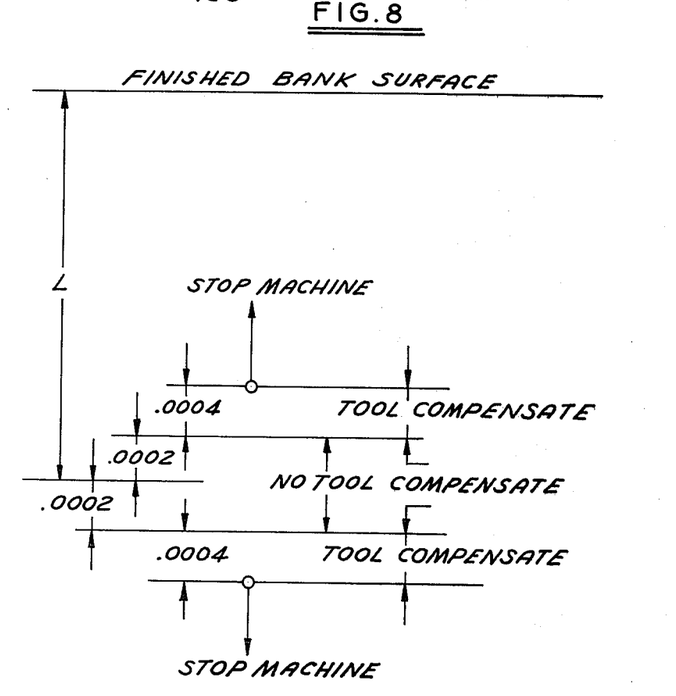
FIG. 8 depicts the limiting dimensions of the automatic tool compensating means.
Figure 9:
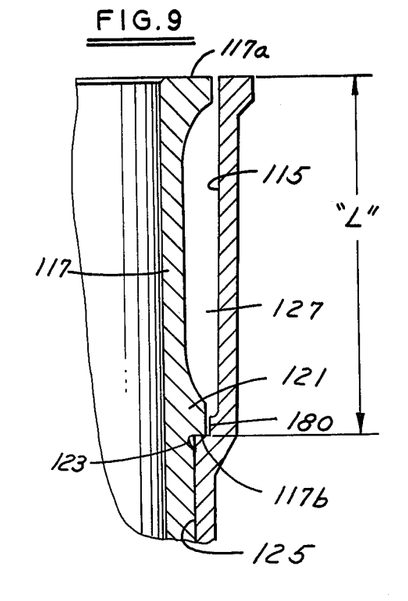
FIG. 9 is a fragmentary, sectional view of a compensated counterbore with a liner in place.

As best seen in FIGS. 6 and 8, an annular stop ring 124 is mounted on the tool holder shaft portion 66 by a collar 216 and a compensating mechanism to be described. Collar 216 carries an O-ring seal 215 that seals the outboard end 127 of stop ring 124. An annular seal 126 is mounted in the recessed shoulder portion 128 of stop ring 124 and abuts the outer diameter 130 of the tool holder body to prevent swarf and coolant from entering the uppermost portion of the spindle.

FIG. 6 shows a top plan view of the stop ring 124 mounted on pivots 240 with the air passages 150a and 150b adapted to contact the work surface 120 of the workpiece 122. The passages 150a and 150b are connected to passages 152a and 152b which in turn is connected to a central passage 154 and the main passage 156. The main passage 156 leads to a passage 162 of an outlet or fitting 160, which in turn leads to an air supply that provides pressurized air through the passages 150a and 150b to blow off any dirt or swarf before contacting the work surface 120, defined by the aforesaid upper and lower bank rails 120a, 120b.

The distance L from the bank rails of surface 120 to the shoulder 180 of the internal diameter of the bore precisely matches the finished length of the liner 117 between surface 117a and end 117b. This length L is specifically held to ±0.0008 of an inch because a sleeve liner must be fitted thereto precisely to seat the liner 117 to seal jacket 127.

FIG. 8 shows that the cutting tool will compensate either axially into or out of the workpiece bore. The amount of required compensation is determined by a gauge mechanism that measures the length L in the next operation of a transfer line. If the distance L varies from the predetermined norm dimension, the tool body will move either axially in or out of the workpiece bore. For example, in the preferred embodiment shown, the L dimension is given as 3.0275 inches and the limits of the dimension given are 3.0269 inches and 3.0281 inches. The tool will not compensate if the norm deviates ±0.0002 inches; however, if the dimension L exceeds ±0.0002 inches from the predetermined norm dimension, in this case 3.0275 inches, then the tool will compensate or move into or out of the workpiece bore, in a manner to be hereinafter described. The gauging mechanism transmits a positive or negative signal depending on the type of correction or compensation required to the stepping motor 182 shown in FIG. 2A. The stepping motor will rotate the shaft 184 in incremental steps depending on the correction required to bring the tool back to the predetermined norm dimension. A pulley 186 is mounted on the shaft 184 and provides transfer of the stepping motor shaft rotation to the pulley 188 mounted on the shaft 190 by means of a belt 192. The pulley 188 is mounted on the shaft 190 by means of a threaded nut 193. The shaft 190 extends alongside and parallel to the tool spindle shaft 40 within a bore 194 parallel to the bore 42 of the spindle head assembly 22. The shaft is supported by means of a rear bearing 196 and a front bearing 198. The pilot portion 200 of the shaft 190 is mounted in a pilot bearing 202 which is mounted in a bore 203 in one side of collar 216 having forked ends 217, 218. A pinion 204 is mounted on the pilot portion 200 of the shaft 190 and held in place by a pin member 206. The pinion 204 is meshed with the gear 210 of an axial adjusting sleeve 208. The adjusting sleeve 208 also includes a threaded portion 212 on the outer portion thereof adjoining the gear portion for purposes to be herein described. The threaded portion 212 on the outer diameter is threadedly engaged with the threaded portion 214 on the interior of collar 216. The sleeve 208 is mounted on bearings 220 and the bearings 220 are held in place by a shoulder 221 at one end and a securing ring 222 at the other end. The securing ring 222 is held in place by a plurality of screws 224 that are mounted to the adjusting sleeve 208. The bearings 220 are mounted on the inner diameter thereof within circumferential recess 226 on the outer diameter of tool holder body 70. The bearing 220 is held in place by an annular securing ring 228 which in turn is held in place by a plurality of screws 230. The collar 216 is adapted to be axially or longitudinally movable within the inner recess of the cup-shaped flange 232 in a manner to be described herein. The cup-shaped flange 232 is mounted to the housing 44 by a plurality of screws 234.

OPERATION

During automatic in-line transfer operations performed to a plurality of bores on an engine block, a gauge is inserted into each of the bores to determine the length "L" of the bore. This information is transferred to a resolver, which in turn determines whether four conditions exist; (1) no tool compensation required, limits of dimension "L" are held within ±0.002 inch, (2) tool compensation required in a "tool retract" direction when the dimension of "L" exceeds ±0.0002 inch, (3) tool compensation required in the opposite direction, or "tool extend" direction, when the dimension of "L" is less than −0.0002 inch from the norm dimension, and (4) stop the machine when the dimensional tolerance exceeds ±0.0004 inches.

The signal identified as either to retract or extend the tool for tool compensation is sent to the stepping motor 182. The stepping motor in turn will rotate the shaft 190 by means of rotatable belt 192 as shown in FIG. 2A. Movement of the shaft 190 effects rotation of pinion 204, which in turn causes rotation of gear 210 of sleeve 208. The spindle head assembly 22 along with other components, flange 232, adjusting sleeve 208, is longitudinally stationary, and any rotation imparted through the mating gears 204 and 210 effects rotational movement only of adjusting sleeve 208. However, rotational movement of sleeve 208 will impart linear movement to collar 216 via mating threads 212 and 214, respectively. Linear movement of collar 216 also results in a longitudinal movement of stop ring 124. The longitudinal movement of the stop ring will cause the tools to be seated either deeper into the bore or withdrawn out of the bore to establish the proper dimensional distance L.

To provide for proper positioning of the cutting tool with respect to spaced reference surfaces, the stop ring 124 and the collar 216 are mounted on trunnions 240. The trunnions 240 extend through a bore 242 in the collar 216 and extend into a recess 244 of the stop ring 124. The mounting of the cutting tool on the trunnions 240 provides for a slight mis-alignment of the bank rail surfaces 120a, 120b near each bore to maintain the proper dimension L by averaging locating point error.

While the best mode for practicing the invention has herein been described in detail, those familiar with this art will recognize various alternative designs and embodiments for practicing the invention as defined by the following claims.

What is claimed is:

1. A spindle head bore depth compensating assembly for controlling a predetermined bore depth dimension between an outer reference surface on a workpiece having a bore with an interior bore surface to be finish machined, the combination of: a spindle head slide (14) having a positive machine stop (93); a spindle head (22) carried by said slide including stop means (124) engageable with the outer reference surface; a spindle shaft (40) having a driven end (28) and frontal portion (71); bearing means (46, 48) at opposite ends of said spindle shaft for supporting said spindle shaft for axial movement and rotation relative to said spindle head; a tool holder body (70) having an outer circumference and one end insertable into the workpiece bore; connector means (72, 76) for connecting said tool holder body to said frontal portion; a spring cavity (90) in said tool holder body arranged concentrically of said connector means; mechanical spring means (84) in said cavity to spring load said tool holder whereby engagement pressure of said stop means (124) on the workpiece during a spindle head feed stroke is limited to the spring rate of said mechanical springs means as the spindle slide engages said positive machine stop; tool means (112) supported on the outer circumference of said tool holder for finish machining the interior bore surface; means (109) (110) for pre-setting said tool means at a fixed axial and radial position on said tool holder body; an adjustment sleeve (208) on said tool holder body; bearing means (220) for supporting said tool holder body for rotation within said adjustment collar and for axially fixing said adjustment sleeve with respect to said tool holder; and drive means for adjustably positioning said sleeve with respect to said stop means (124) to adjust the position of said stop means (124) axially of said sleeve (208) thereby to compensate for the depth of cut of said tool means (112).

2. In the combination of claim 1, said drive means including a depth compensating stepping motor means (182) having a drive shaft (184) located in spaced, offset parallelism to the longitudinal axis of said spindle shaft (40); a depth compensation shaft (194) supported by said spindle head (22) in spaced parallelism to said spindle shaft (40) having one end (188) at the driven end (28) of said spindle shaft and the opposite end adjacent said adjustment sleeve (208); means including a pinion (204) on said opposite end and a gear (210) on said adjustment sleeve to impart rotational movement to said sleeve (208) for producing linear movement of said stop means to compensate for the depth of cut of said tool means (112) and whereby the pinion (204) and gear (210) define a torque arm closely adjacent the said tool means (112) to hold it in its depth compensated positon.

3. In the combination of claim 1, said stop means including a collar (216) having forked ends (217, 218), a stop ring (124) engageable with the workpiece, means including a pair of spaced pins (240) defining a pivot axis for pivotally supporting said stop ring (124) on said collar (216) to compensate for misalignment of spced locating points on the workpiece.

4. In the combination of claim 2 said adjustment sleeve (208) having an external thread (212), a collar guide flange (232) secured to said spindle head (22); said stop means including a collar (216) slidably supported by said collar guide flange having an internal thread (214) thereon threadably engaged by said external thread (212), said collar (216) having forked ends (217, 218), a stop ring (124) engageable with the workpiece, means including a pair of spaced pins (240) defining a pivot axis and pivotally supporting said stop ring (214) on said collar (216) to compensate for misalignment of spaced locating points on the workpiece.

* * * * *